(12) United States Patent  (10) Patent No.: US 9,283,990 B1
Yaeger et al.  (45) Date of Patent: Mar. 15, 2016

(54) ROBOTIC PERSONAL ASSISTANT

(75) Inventors: Gerard Francis Yaeger, Mechanicsburg, PA (US); Anthony Justo Nunez, Arlington, VA (US)

(73) Assignee: Infamous Robotics, LLC, Arlington, VA (US)

( * ) Notice: Subject to any disclaimer, the term of this patent is extended or adjusted under 35 U.S.C. 154(b) by 502 days.

(21) Appl. No.: 13/428,427

(22) Filed: Mar. 23, 2012

Related U.S. Application Data

(60) Provisional application No. 61/467,926, filed on Mar. 25, 2011.

(51) Int. Cl.
 *B62D 21/02* (2006.01)
 *B62D 21/00* (2006.01)

(52) U.S. Cl.
 CPC ...................... *B62D 21/00* (2013.01)

(58) Field of Classification Search
 USPC ........... 180/65.1, 167, 168, 169, 312; 701/22, 701/23; 318/568.11, 568.12
 See application file for complete search history.

(56) References Cited

U.S. PATENT DOCUMENTS

| | | | | |
|---|---|---|---|---|
| 6,053,519 A | * | 4/2000 | Poindexter et al. | 280/250.1 |
| 7,348,747 B1 | * | 3/2008 | Theobold et al. | 318/568.21 |
| 8,209,074 B2 | * | 6/2012 | Sonoura | 701/23 |
| 8,272,466 B2 | * | 9/2012 | Moriguchi et al. | 180/167 |
| 8,346,390 B2 | * | 1/2013 | Ruan et al. | 700/245 |
| 8,740,240 B1 | * | 6/2014 | Merel | 280/304.1 |

* cited by examiner

*Primary Examiner* — John Walters
(74) *Attorney, Agent, or Firm* — McNeely, Hare & War LLP; Kevin J. McNeely

(57) ABSTRACT

A robot assembly includes a drive system attached to a frame. The robot drive system includes a base platform, a driver motor base assembly attached to the platform and an adjustment device that adjustably attaches the base platform to the drive motor assembly. The robot frame includes a top horizontal beam assembly that defines a first rectangle, a bottom horizontal beam assembly that defines a second rectangle and a set of main support beams that join the first rectangle to the second rectangle to define a shape of an isosceles trapezoid.

10 Claims, 26 Drawing Sheets

FRONT

BACK

FRONT

SIDE

TOP

FRONT

SIDE

FRONT

SIDE

ROBOTIC PERSONAL ASSISTANT

CROSS REFERENCE TO RELATED APPLICATIONS

This utility patent application claims priority to U.S. provisional patent application Ser. No. 61/467,926 filed on Mar. 25, 2011, which is incorporated by reference herein.

TECHNICAL FIELD

The application related to the field of robotics and more specifically, to the use of robots to assist with daily activities.

BACKGROUND

The United States is in the midst of an explosion in demand for elder care and assistance. Quality of life is a main concern of the aged, who have a strong desire to maintain some level of independence. At the same time there are an increasing number of individuals with handicaps and disabilities who also have the same desire to maintain some level of independence.

SUMMARY

To address this problem, the creation of a Robotic Personal Assistant (RPA) has been conceived and is described below. The purpose of the RPA is to allow the elderly, disabled and handicapped to accomplish their daily activities with minimal intervention from health care providers.

The RPA is designed to improve the quality of life and increase the independence of individuals with special needs. There are three main groups of users that the initial device is targeted at:

1. The elderly that have limited mobility.
2. The handicapped/disabled with limited use of their limbs.
3. The hearing impaired and blind individuals.

The device can be configured into different models to uniquely serve the specific needs of each group. The model for the first two groups will be specifically designed for ease of use when sitting or reclining.

A special model for group three individuals will include extra sensors that will help overcome their specific limitations.

All models will include a provision for use of a small handheld wireless control that can be used to control the model directly if desired.

The RPA is designed to be easy to use and interface with. It is designed to present itself to an elderly or handicapped individual as a friendly non-threatening, personal assistant.

The RPA will have two modes of operation, autonomous and tele-operated. The autonomous mobile platform is designed to accept voice commands from its user and will follow them, when commanded. It is designed to follow at a safe distance and to stop a safe distance from the user. The second mode of operation will be tele-operated mode, where the user takes manual control of the robot via a small handheld wireless interface.

The RPA will be able to move through hallways avoiding both individuals and obstructions such as furniture and walls.

The RPA will be able to recognize when a person has fallen.

The RPA will have ample provision for carrying and storage of everyday items such as eyeglasses, cell phones, newspapers, books and pens/pencils.

The RPA will have a real time clock which will be used to remind the user to take medication and remind them of appointments. It can also be programmed to ask the user if they have taken medications. The device will be able to understand simple commands or replies from the user, such as "YES", "NO", "COME HERE".

Some versions will have a robotic arm controlled by a wireless interface. This will allow a user to remotely pick up items that are within his view. A wireless video camera is another option that will allow wireless control of the device out to several hundred feet. This range will allow the immobile or mobility limited user to retrieve items from around a home or care facility.

Another option is an interface for the deaf. A video display can be mounted on the device so that voice-to-text converter can display conversations around the user. It can also be interfaced to existing fire detection system to alert the user to the presence of a fire by a wireless interface to a wristband with a vibrator, similar to a vibrator in a cell phone.

Part of the fire detection system will be a wireless transmitter to activate a light strobe and wireless beacon near the exit. The user will be instructed to follow the device to the exit.

In one general aspect, a robot drive system, includes a base platform, a driver motor base assembly attached to the platform and an adjustment device that adjustably attaches the base platform to the drive motor assembly.

Embodiments may include one or more of the following features. For example, the drive motor assembly may have a base, a bearing support connected to the base, a bracket attached to the base, a motor attached to the bracket, a shaft coupler attached to the motor and a shaft connected between the bearing support and the shaft coupler. The adjustment device attaches the base platform to the base of the drive motor assembly.

As another feature, a wheel may be attached to the shaft. The wheel extends through an opening in the base platform and the adjustment device varies the height that the wheel extends through the opening. The adjustment device may include one or more bolts passing through the base platform and the driver motor base assembly, each bolt having a pair of adjustment nuts that vary the distance between the base platform and the drive motor assembly. Each bolt has a head and a shaft, with the shaft passing through a first slot in the drive motor assembly and a second slot in the base platform. A securing nut may be used so that the head of the bolt and the securing nut fix the position of the base platform to the drive motor assembly.

As another feature, caster wheels may be attached to the base platform and drive wheels may be attached to the drive motor assembly and extending though an opening in the base platform. Each drive wheel is configured to provide traction and each caster wheel is configured to provide maneuverability on a surface.

In another general aspect, a robot assembly includes a robot frame with a top horizontal beam assembly that defines a first rectangle, a bottom horizontal beam assembly that defines a second rectangle and a set of main support beams that join the first rectangle to the second rectangle to define a shape of an isosceles trapezoid.

Embodiments may include one or more of the above or following features. For example, intermediate support brackets can be attached to the main support beams between the top horizontal beam assembly and the bottom horizontal beam assembly and the intermediate support brackets may define a rectangle. There may be first, second and third sets of intermediate support brackets.

The robot frame can have a shoulder assembly that include a set of shoulder brackets that define a rectangle with a length side and a width side wherein the shoulder brackets attach to the main support beams along the length side such that the width sides extend beyond the second rectangle defined by the bottom horizontal beam assembly.

As another feature, the robot frame can have a connection bracket to provide an angled connection interface between the top horizontal beam assembly and the main support beams. In addition, the robot frame can have a base platform attached to the bottom horizontal beam assembly.

The robot assembly can include a driver motor base assembly and an attachment device that adjustably attaches the driver motor assembly to the base platform of the robot frame. The driver motor assembly is positioned between the top horizontal beam assembly and the bottom horizontal beam assembly. In addition, driver motor base assembly can include drive wheels that extend through an opening in the base platform.

An external structure may be attached to the robot frame to give the robot assembly a life-like or animated appearance. For example, the external structure may include a head, neck upper body, lower body and arms.

As another feature, the robot assembly may have a computer system that includes a memory, processor, and more than one sensor wherein one or more sensors are attached to the external structure. The computer system may utilize various types of sensors including a sound detecting sensor, a maneuver detection array, a distance sensor array and a human detection sensor array.

DETAILED DESCRIPTION

The device is composed of an internal and an external structure that is fixed to a base assembly. The internal structure provides a rigid and versatile frame so that the RPA is stable and can be modified to attach mechanical components.

Sensors are installed on various areas of the external structure. The sensors are connected to a CPU that is programmed to allow the RPA to perform various tasks.

The Detailed Description of the RPA is set forth in the following subsections:
a. External Structure;
b. Internal Structure;
c. Base Assembly;
d. Drive Motor Assembly
e. Sensors
f. Architecture; and
g. Operation FIGS. 1-27 correspond to certain features of the subsections of the description.

a. External Structure—FIGS. 1, 2 and 3.

Figure 1:
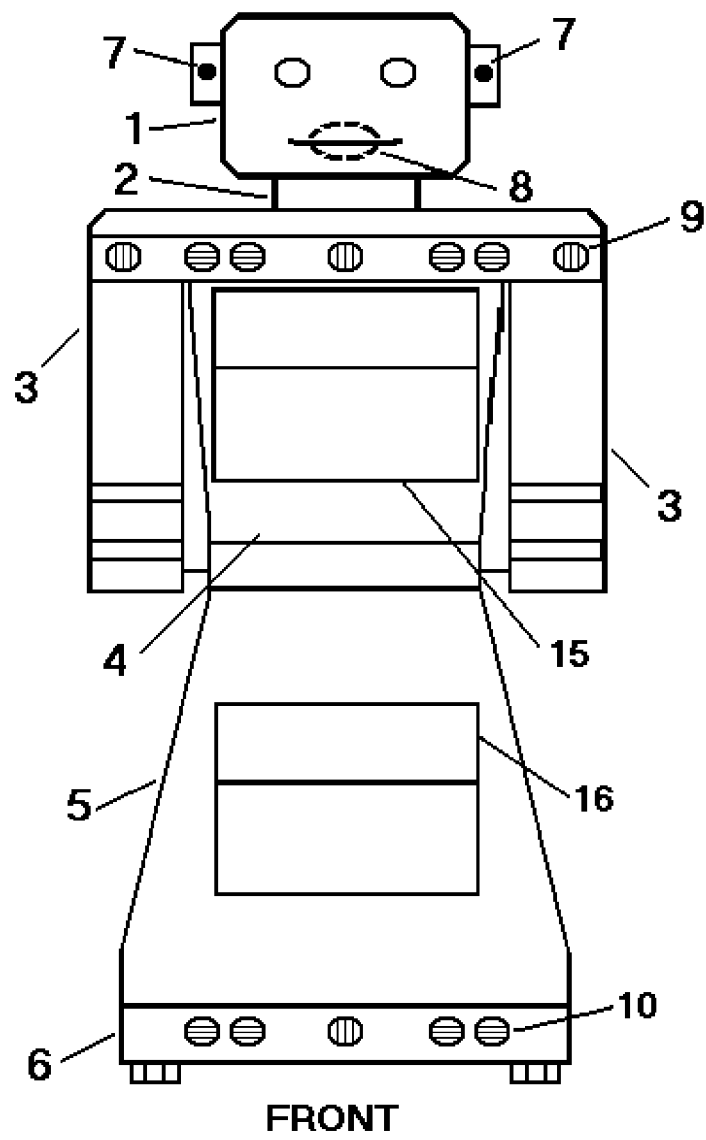
FIGS. 1-3 shows the external structure of the RPA.
Figure 2:
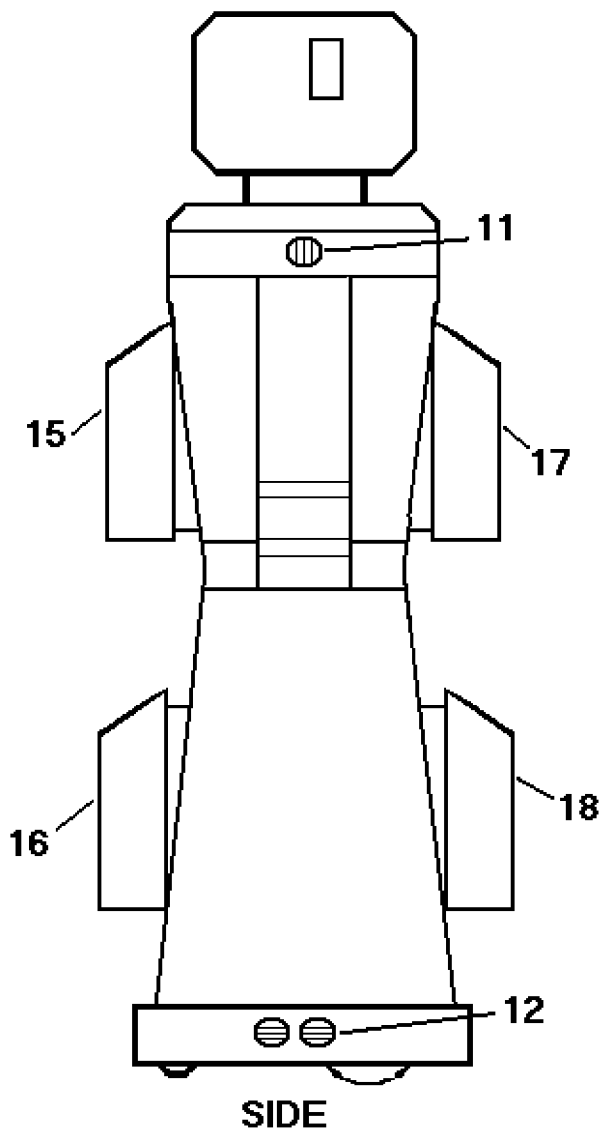
Figure 3:
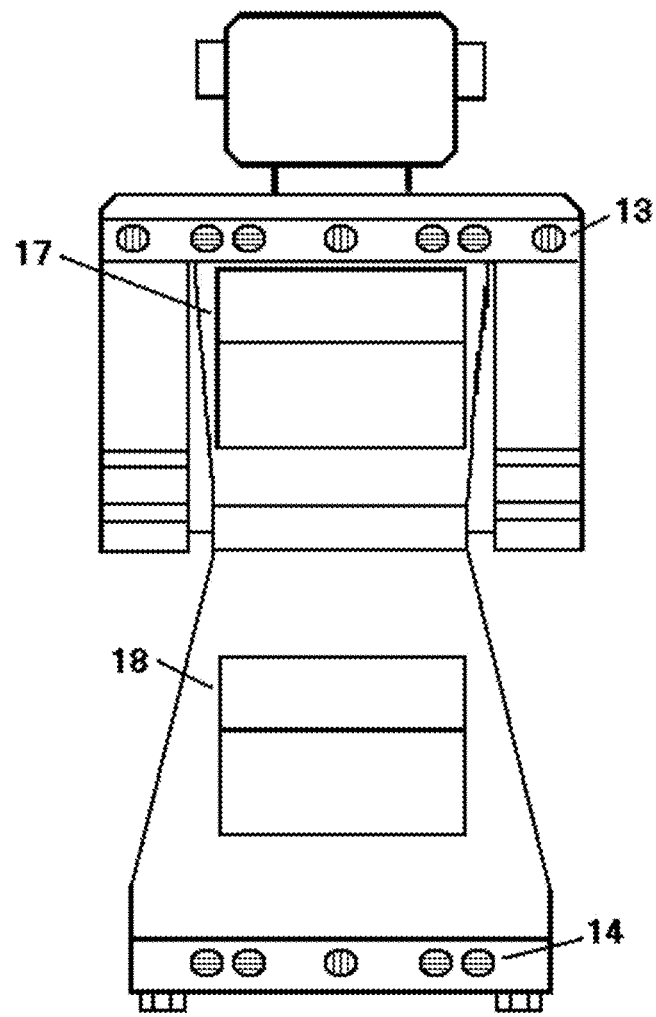

The external structure, shown in FIGS. 1, 2, 3, is composed of a fire resistant covering. It includes a Head 1, Neck 2, Arms 3, Upper Body 4, Lower Body 5 and Base 6.

The Head contains sensor assemblies for distance 7 as well as a loud speaker 8. Additional Sensor assemblies are located in the top front 9, bottom front 9, top side 11, bottom side 12, top back 13, and bottom back 14. Storage compartments are located in the top front 15, bottom front 16, top back 17, and bottom back 18. As an option, the front compartment can be replaced with a video display for assisting individuals who are hearing impaired.

b. Internal Structure. FIGS. 4, 5, 6, 7, 8, 9, 10, 11, 12, 13, 14.

Figure 4:
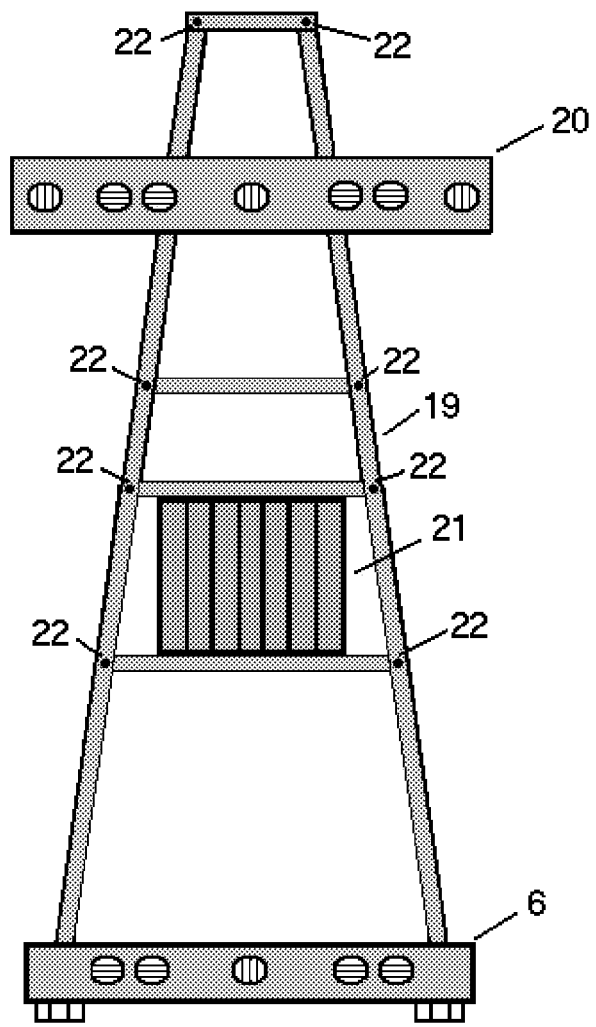
FIGS. 4-14 show the internal structure of the RPA.
Figure 5:
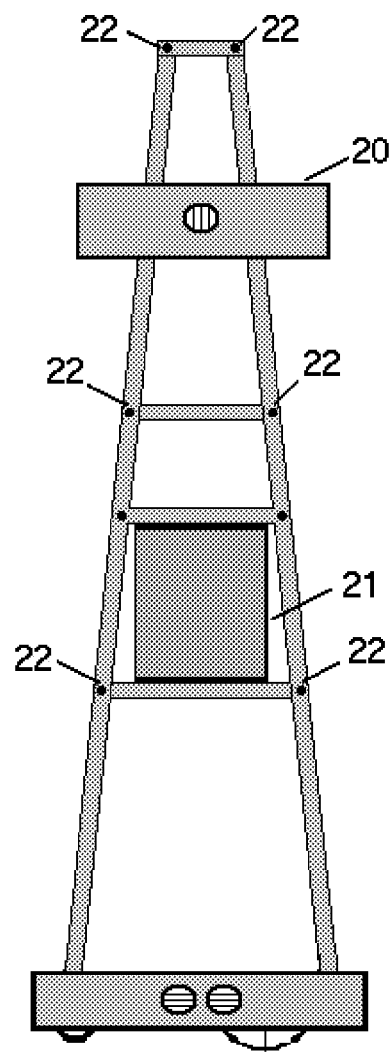
Figure 6:
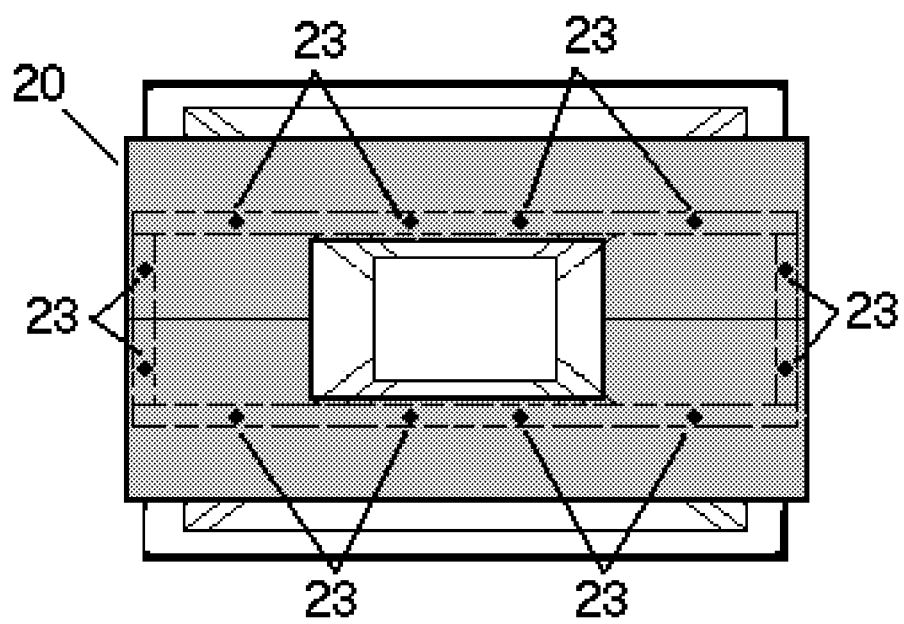

A view of the RPA with the external covers removed is shown in FIGS. 4, 5 and 6. The internal structure is composed of a Frame 19, Shoulder Assembly 20, Circuit Board Card Cage 21, and the Base 6.

Welded Connection Points (CP) 22 are shown in FIGS. 4 and 5. Connection points 23 with removal fasteners are shown in FIG. 6.

Figure 7:
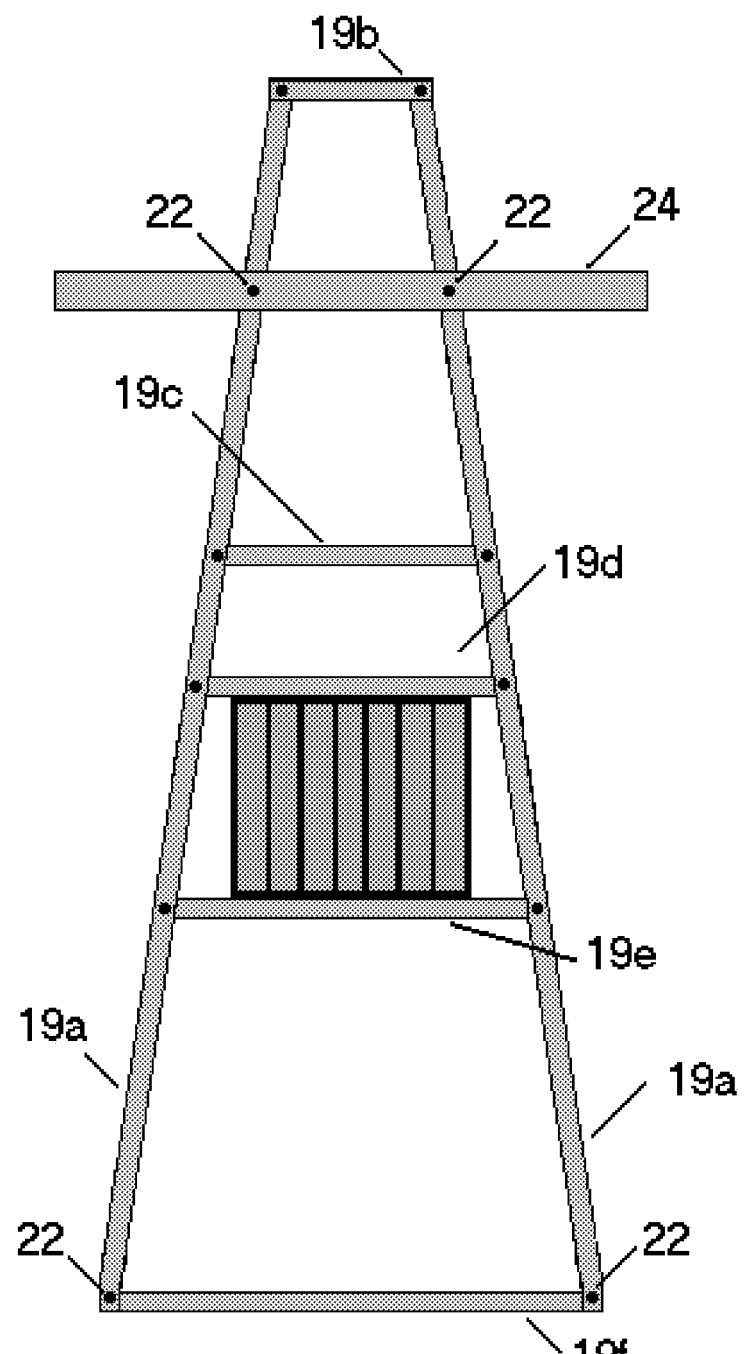
Figure 8:
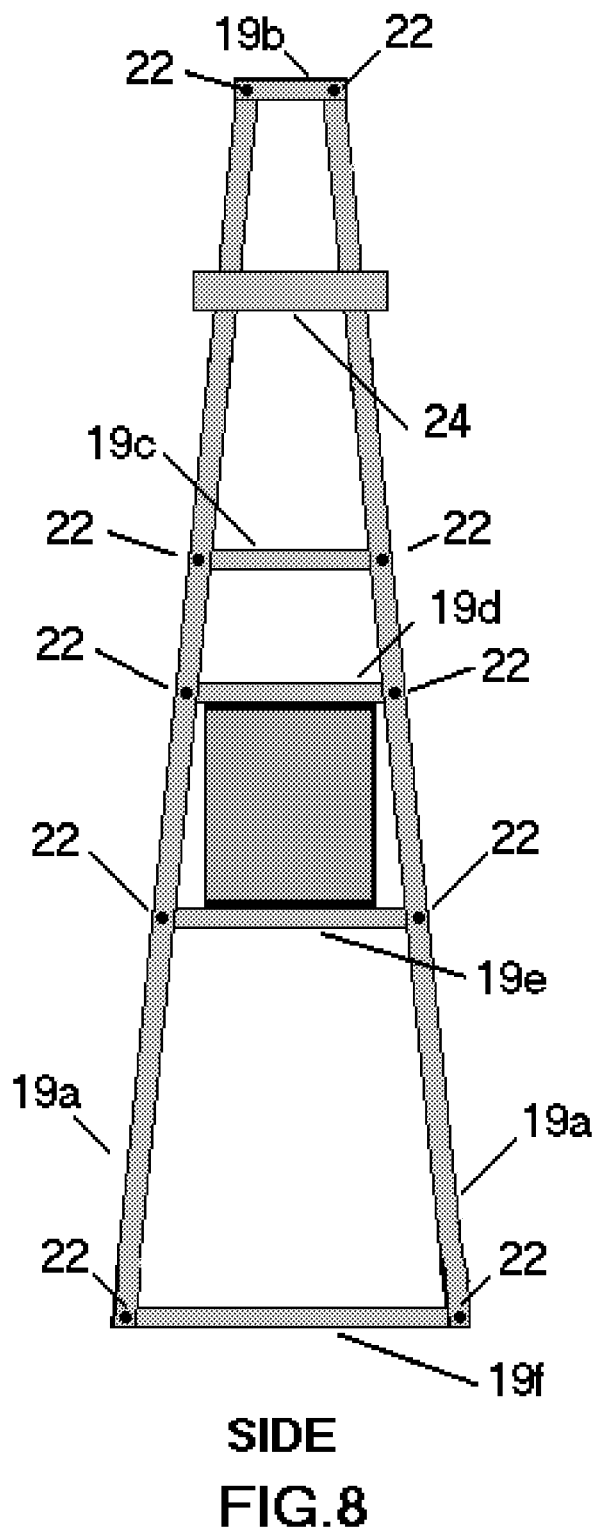
Figure 9:
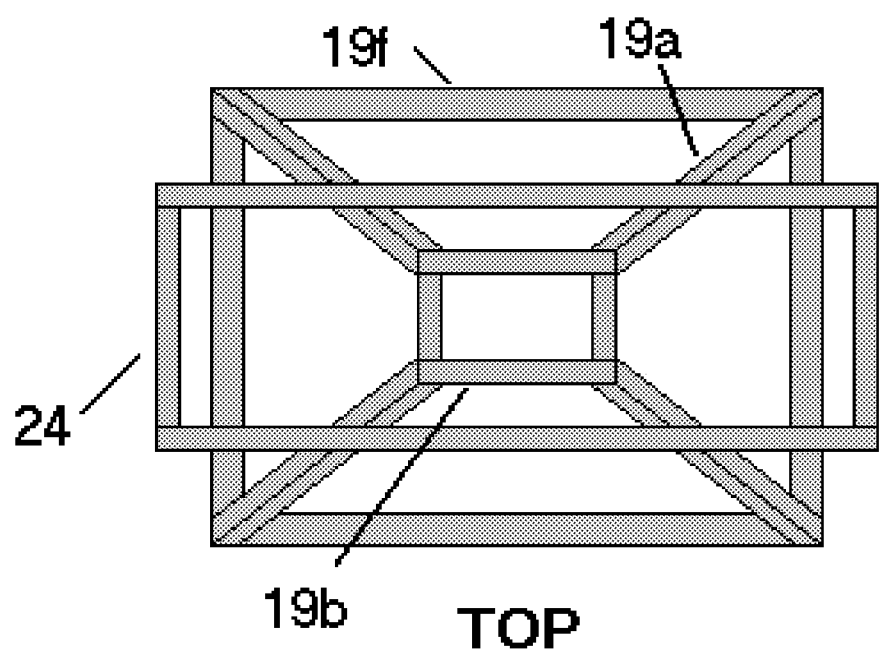

A view of the RPA with the shoulder assembly and base removed is shown in FIGS. 7, 8 and 9. The frame 19 is the main connection point of the RPA to which all other members are attached. The frame is an aluminum structure designed to provide strength and stability to the device with an "A" shape, tower style, construction.

The frame is composed of four main support beams, such as, for example, aluminum angles 19a secured by horizontal beam assemblies at the top (top horizontal beam assemblies), bottom (bottom horizontal beam assemblies) and intermediate support brackets to provide support between the top and bottom. For example, FIG. 7 shows five sets of four horizontal bracket assemblies 19b, 19c, 19d, 19e, 19f to provide an overall appearance of the frame in the shape of an isosceles trapezoid. The frame 19 may be secured by welded connection points 22. The horizontal beam assembly 24 serves as the connection for the shoulder assembly 20. It is also the connection point for an optional remote controlled arm assembly.

Figure 10:
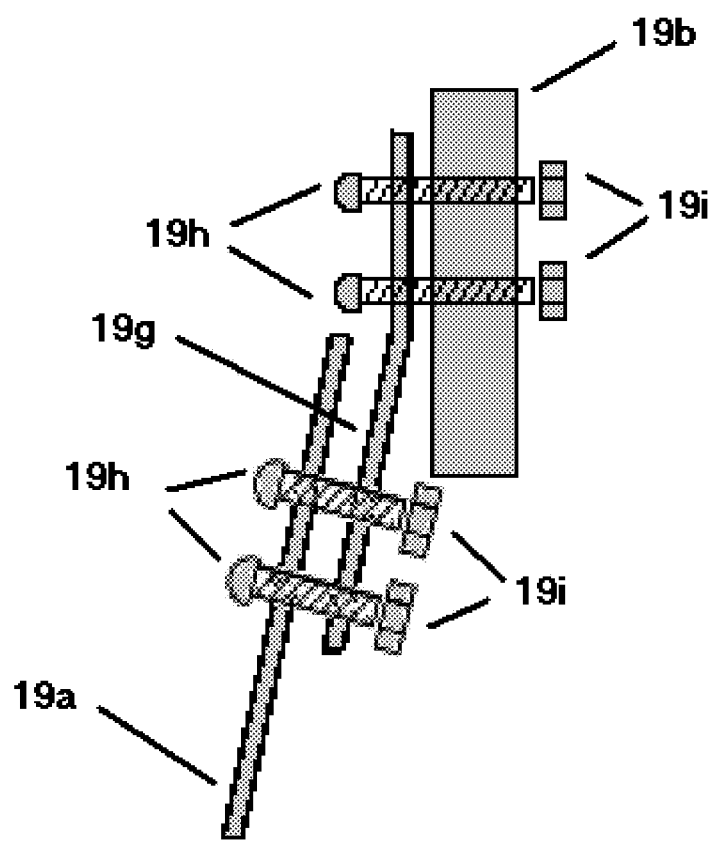
Figure 11:
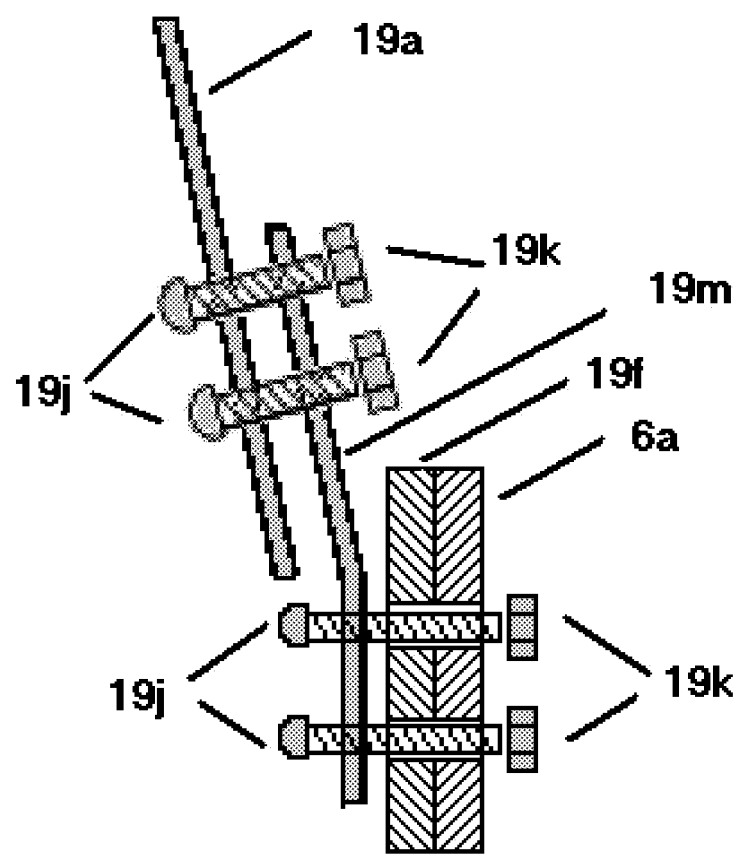

The location of horizontal bracket assembly 19e was chosen to provide ample space to work on the base assembly during and after initial construction. The location of bracket assembly 19c was chosen to provide structural integrity to the frames midsection. Bracket 19d provides the top support for the card cage assembly. FIG. 10 shows the detailed connection of frame angles 19a to the top horizontal bracket assembly 19b. Only half of the angle is shown for clarity. A key feature is a connection angle 19g. This angle is cut and bent to provide the proper angular interface to frame angle 19e. FIG. 11 shows the detailed connection of frame angle 19a to horizontal beam assembly 19f and base element 6a. The key feature is the connection angle 19m.

Figure 12:
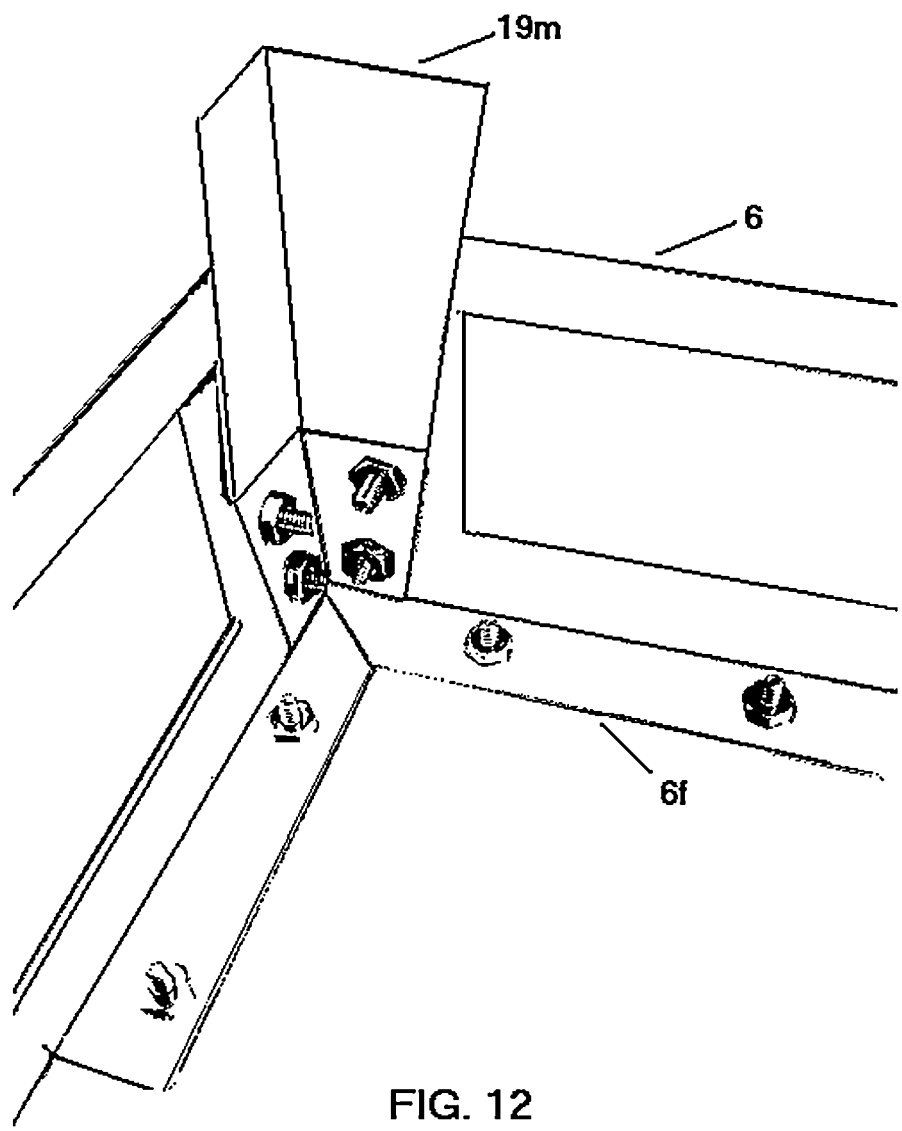

FIG. 12 shows a view of the connection bracket or connection angle 19m attached to base elements 6a and the horizontal beam assembly 6f.

Figure 13:
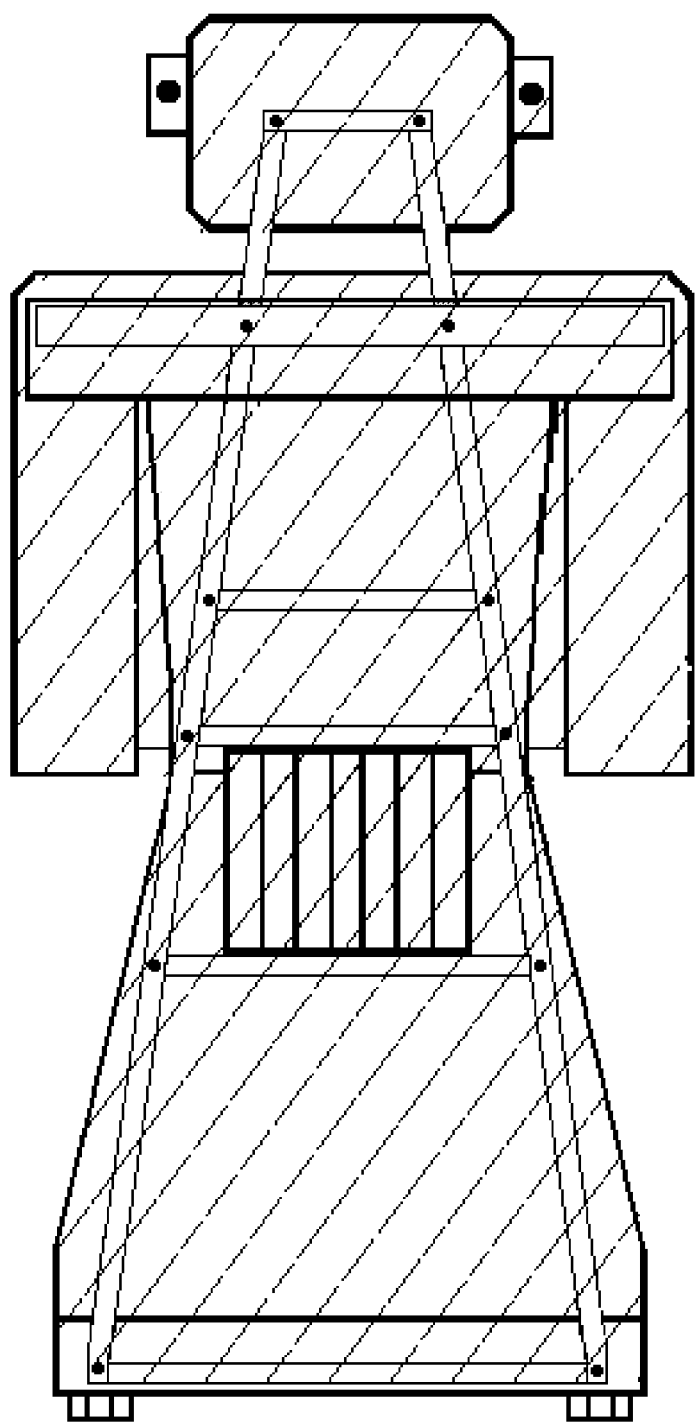
Figure 14:
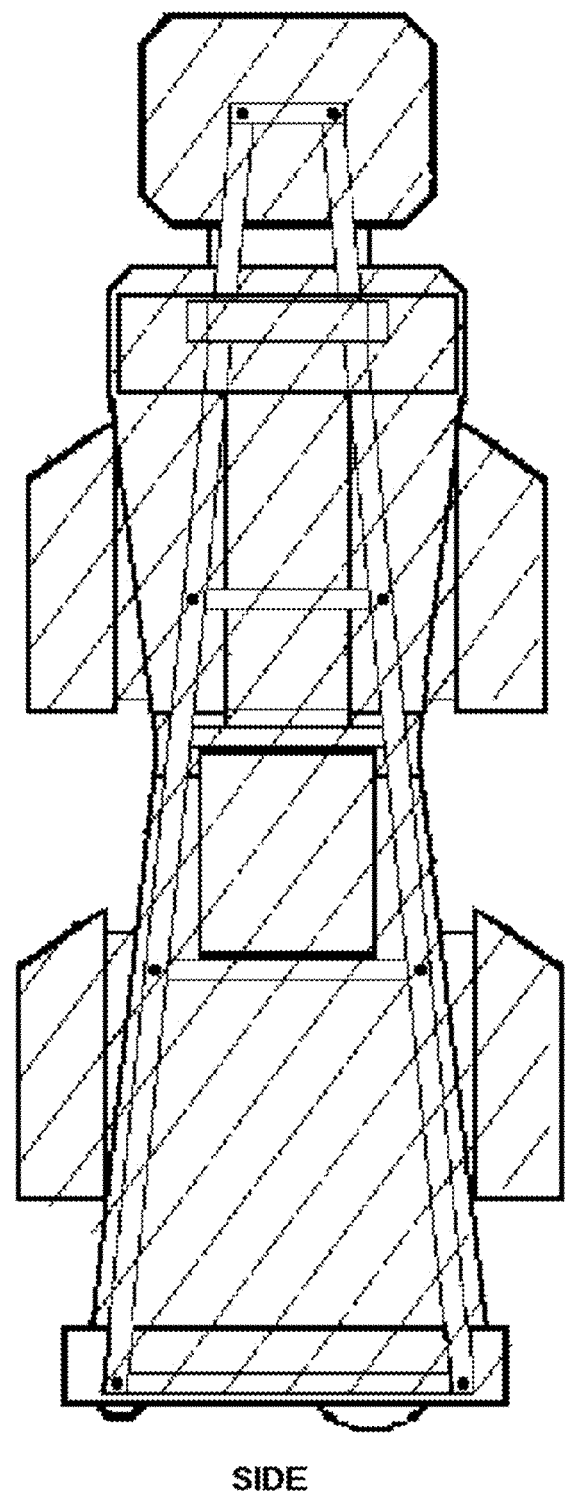

An overlay of the frame on the outer structure of the RPA is shown in FIGS. 13 and 14.

c. Base Assembly. FIGS. 15, 16, 17, 18.

Figure 15:
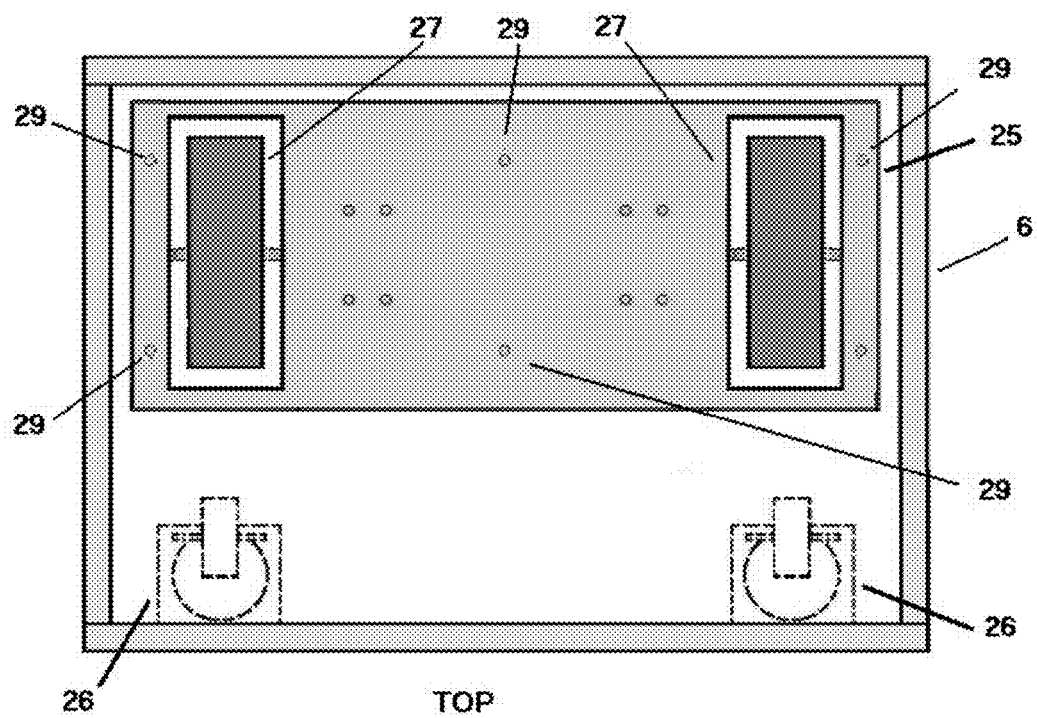
FIGS. 15-18 illustrate a base assembly of the RPA.
Figure 16:
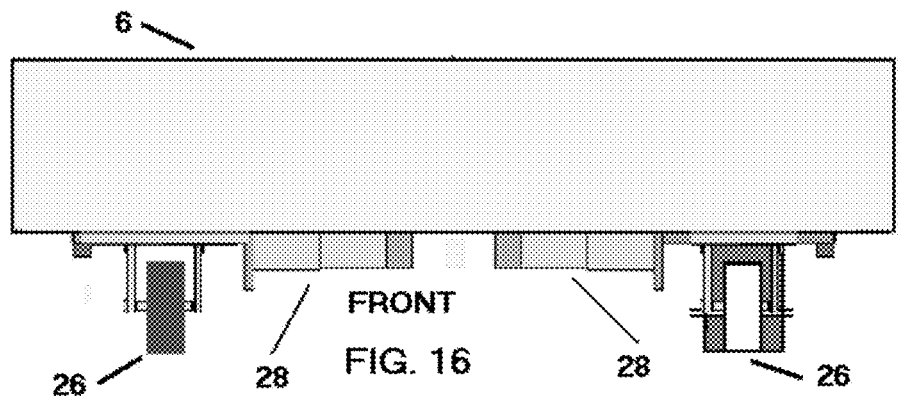
Figure 17:
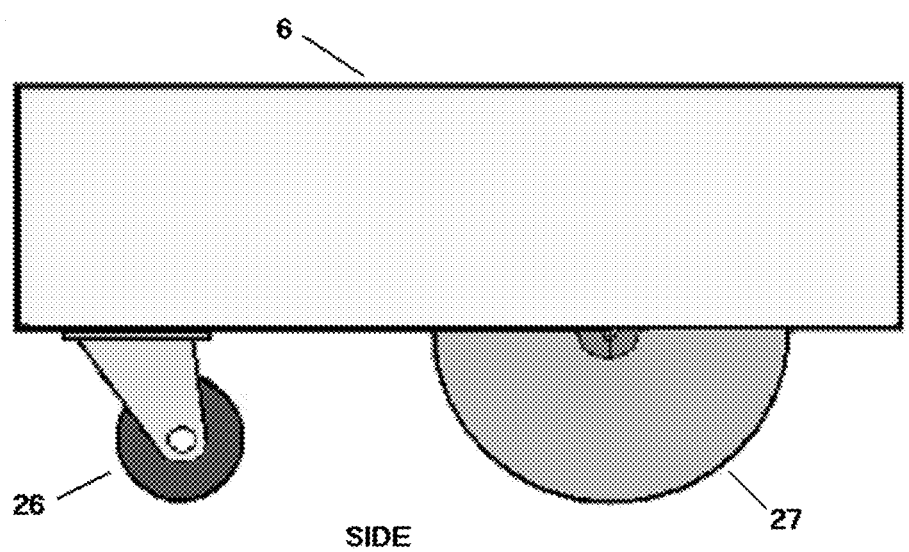
Figure 18:
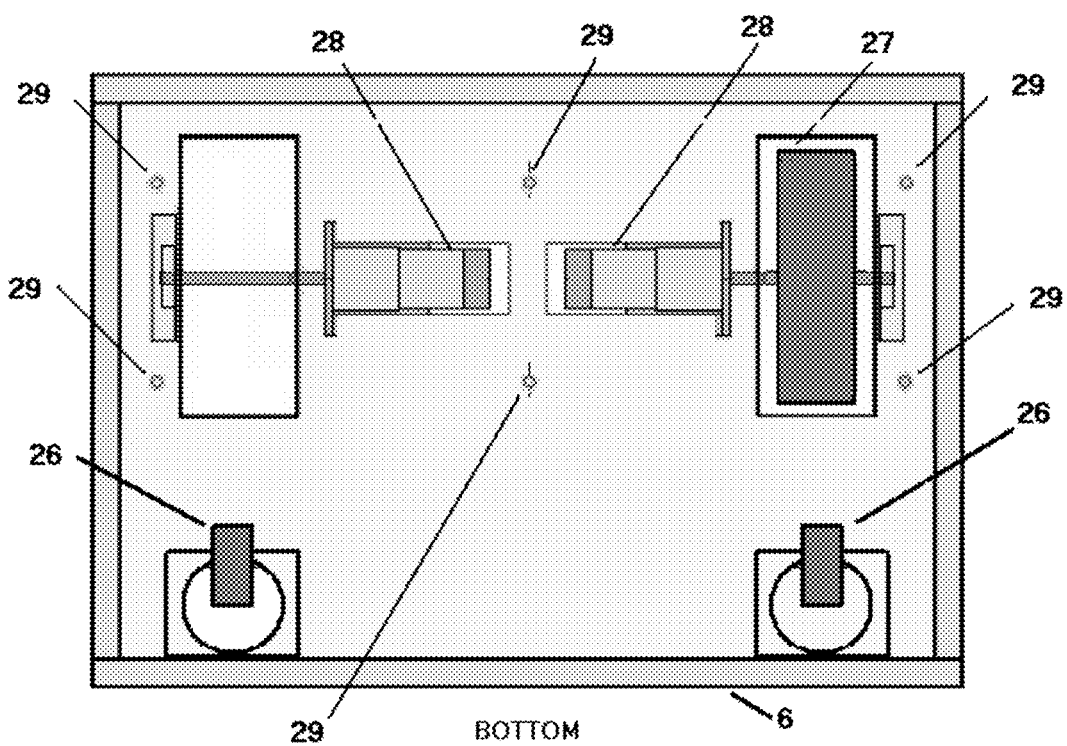
Figure 19:
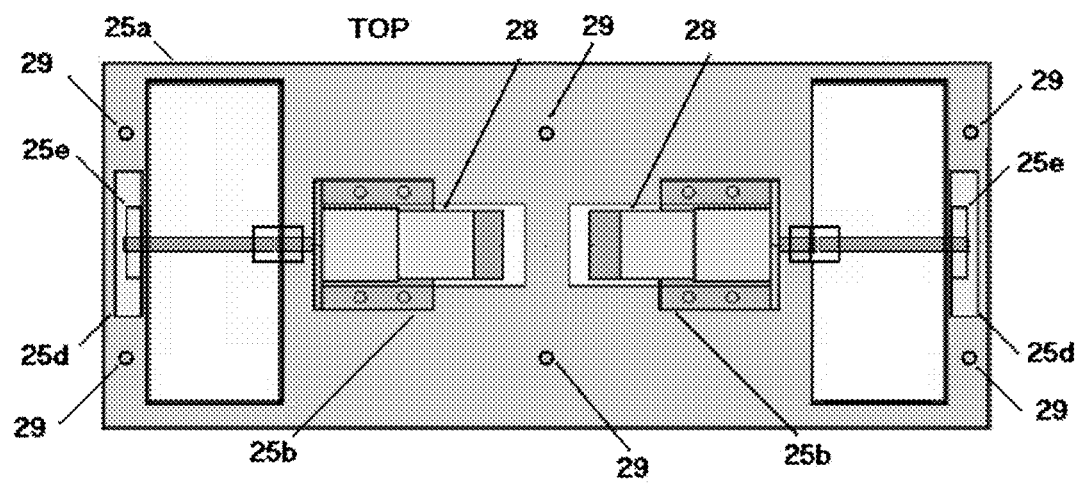
FIGS. 19-22 details the Drive Motor Assembly of the RPA.
Figure 20:
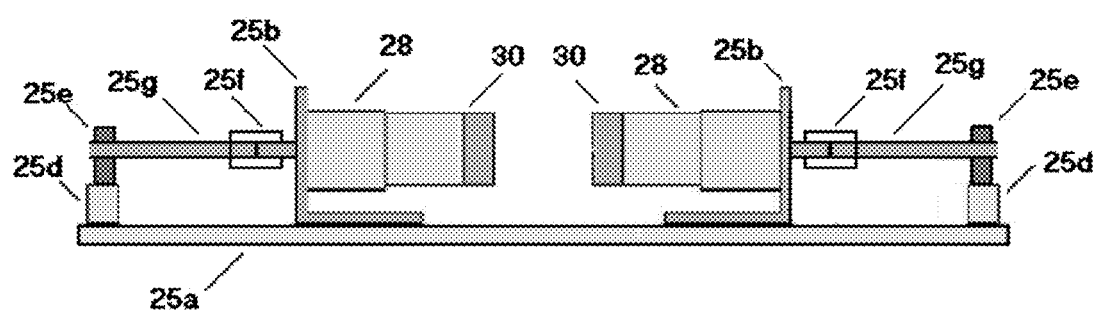

The Base Assembly, FIG. 15, is the foundation of the device. Mobility of the RPA is provided by two motor driven drive wheels 27. Two front casters 26 provide device stability and assist in making turns. The majority of the weight is centered in the base area, giving the device excellent vertical stability. FIGS. 16 and 17 show the location of the drive wheels 27, front casters 26, and drive motors 28. FIG. 18 shows a bottom view of the base assembly.

d. Drive Motor Assembly. FIGS. 19, 20, 21, 22.

The base assembly contains two drive motors 28, one for each of the two drive wheels. Each motor is controlled electronically by a Pulse Width Modulated (PWM) controller/driver circuit board. Each motor contains a motor speed encoder 30.

The drive motor assembly provides for wheel support by way of a pillow block bearing 25e and bearing support 25d. Shaft coupler 25f and shaft extension 25g provide the proper width for various drive wheel configurations. Motor bracket 25b provides a very sturdy mechanical interface between the motor 28 and the drive motor assembly 25a.

Figure 21:
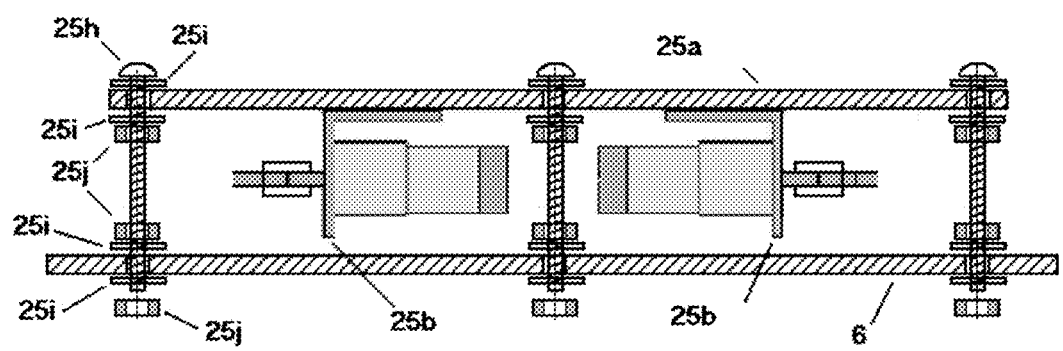
Figure 22:
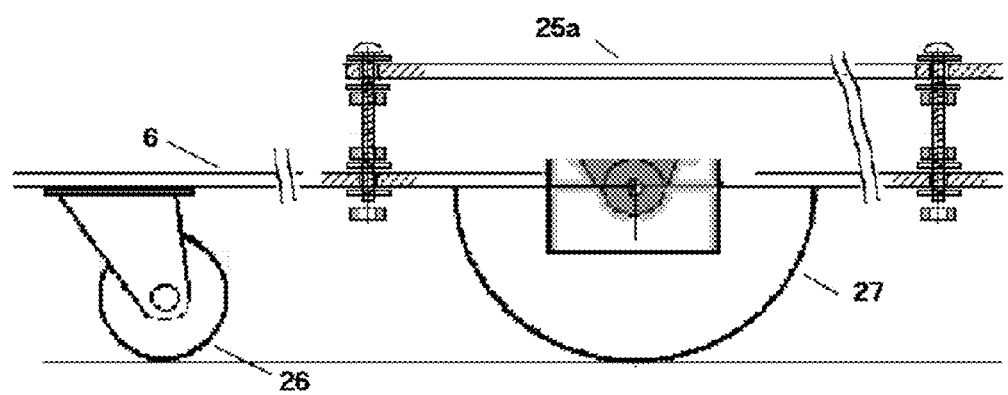
Figure 23:
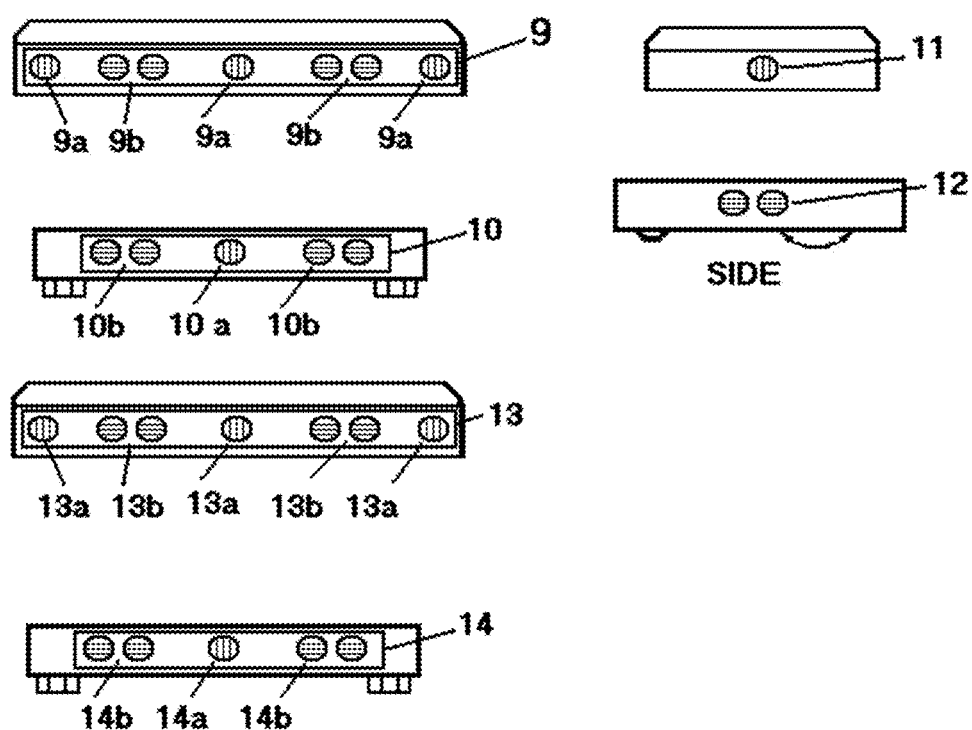
FIG. 23 shows the location and types of sensors used in the RPA.

FIGS. 21 and 22 illustrate the interface between the drive motor assembly 25a and the base 6. A total of six machine screws 25h, are used to connect the two assemblies together. Six holes 29 locate the connection points of the drive motor assembly 25a and the base 6. In the final adjustment phase of initial RPA assembly, the distance between plate 25a and base 6 is adjusted so that the base is parallel to the floor surface. This alignment is shown in FIG. 22. This also means that when sitting on a level floor, the base should be level. In actual use, this adjustment can be changed to provide enhanced traction on specific surfaces.

e. Sensors. FIG. 23.

Figure 24:
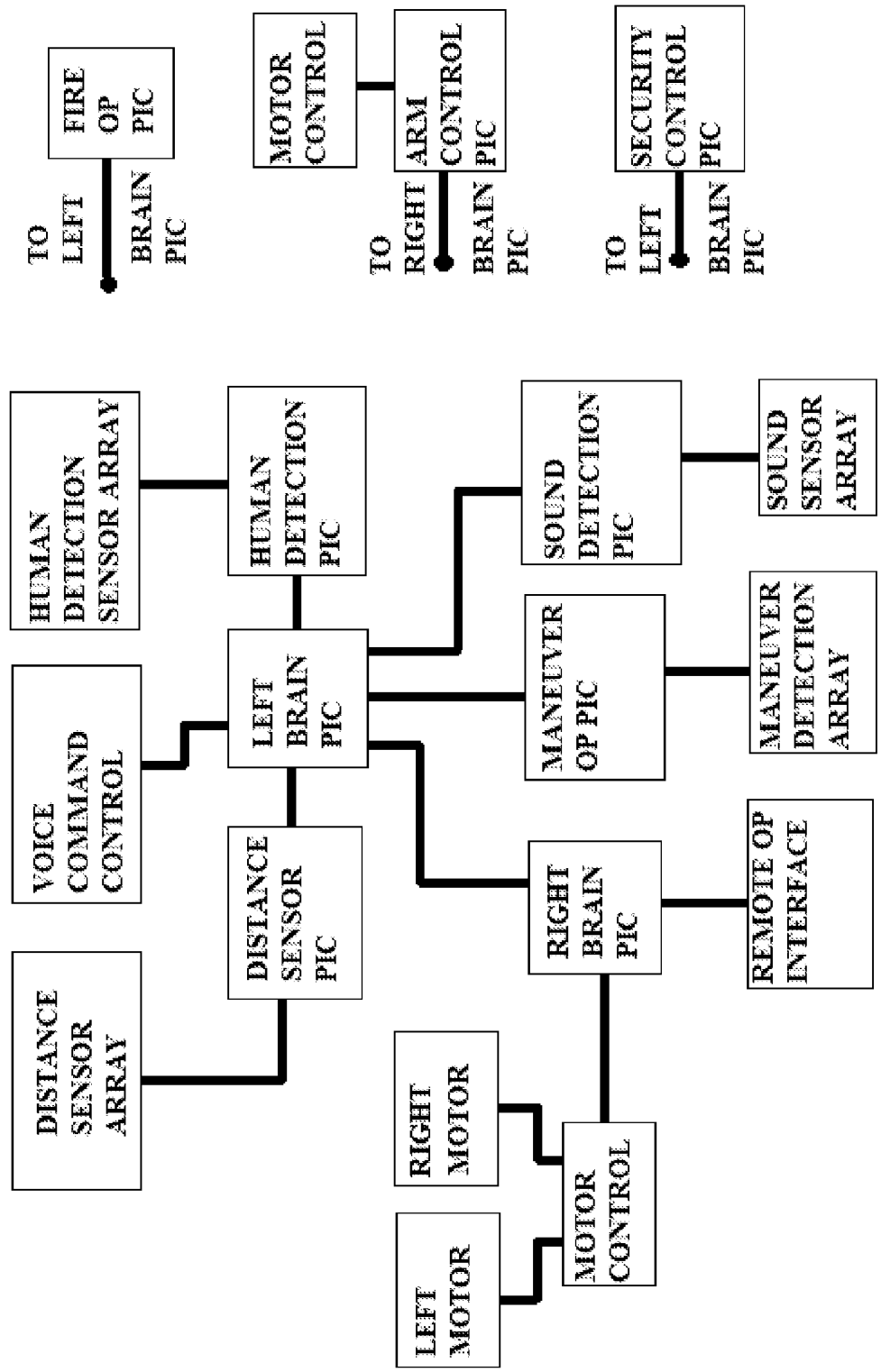
FIG. 24 illustrates an architecture for the RPA IR-RPU.

The sensors are located in four assemblies, two in the front 9 (top), 10 (bottom) and two in the back 13 (top), 14 (bottom). There are additional sensors 11 (top), 12 (bottom) on each side of the RPA. Sensors 9a, 10a, 11, 13a, and 14a are Passive Infra-Red Sensors. Sensors 9b, 10b, 12, 13b, and 14b are distance sensors. Sound sensors 7 are located the head and are shown in FIG. 1.

f. Architecture. FIG. 24.

Figure 25:
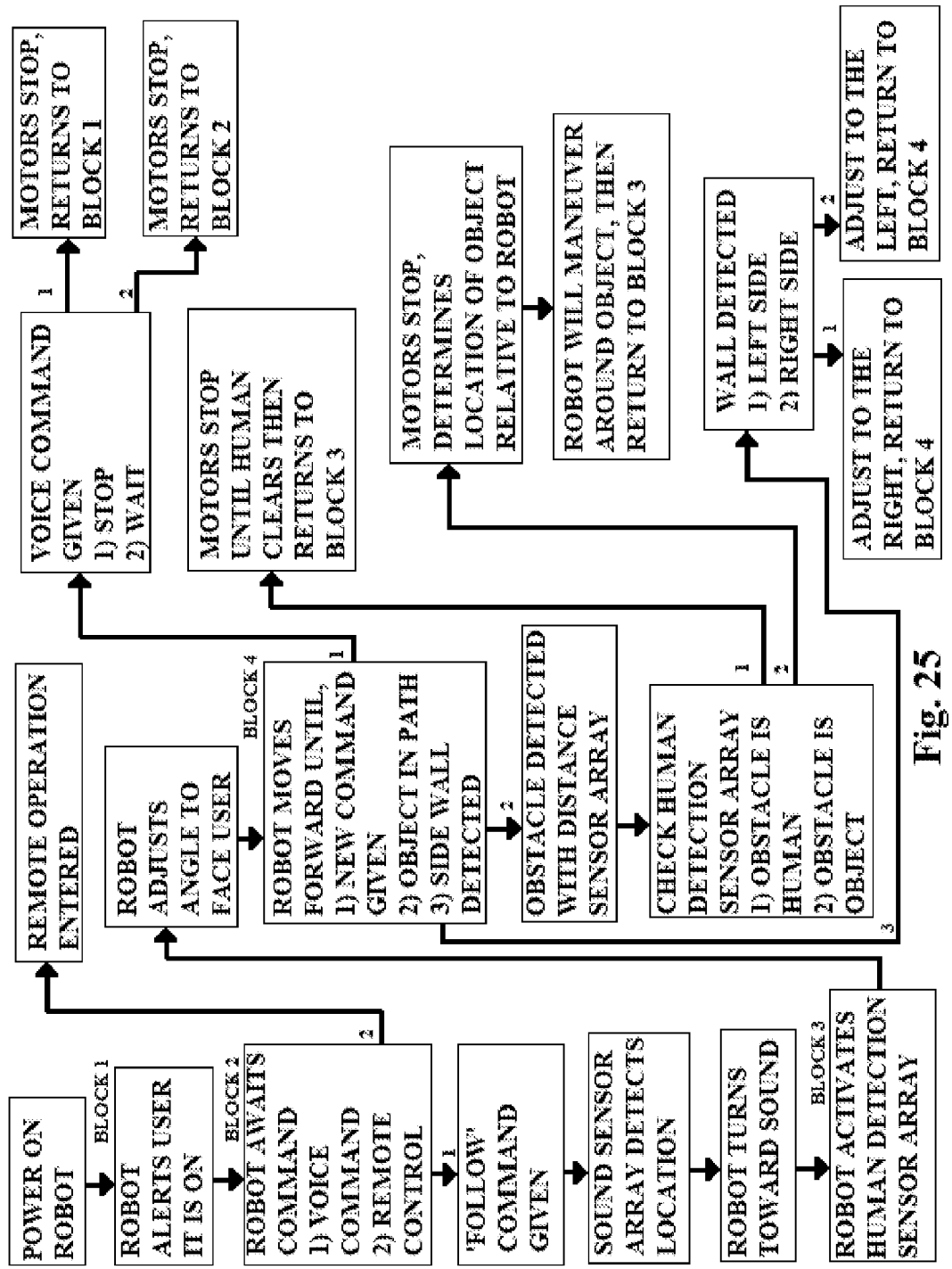
FIG. 25-27 illustrates various modes of operation.

The IR-RPU (Infamous Robotics Reliable Processor Unit) is a low level based architecture that controls the functions (inputs, outputs, actions) of the RPA. The design of the IR-RPU is separated such that isolation of a problem can be easily and quickly identified. This architecture provides inherent safety by not directly linking subtasks to primary modes of operation that may be critical to function or operate properly. If a subtask experiences a problem, the overall system, equipped with redundant main nodes (known as the Left Brain PIC or Right Brain PIC) may continue to a safe point and alert the user to the need for service. Backup Left Brain PIC and Right Brain PIC will enhance the overall reliability of the RPA, being able to take overall if an error is detected in one of the primary Left Brain PIC or Right Brain PIC.

g. Operation. FIG. 25, 26, 27.

Figure 26:
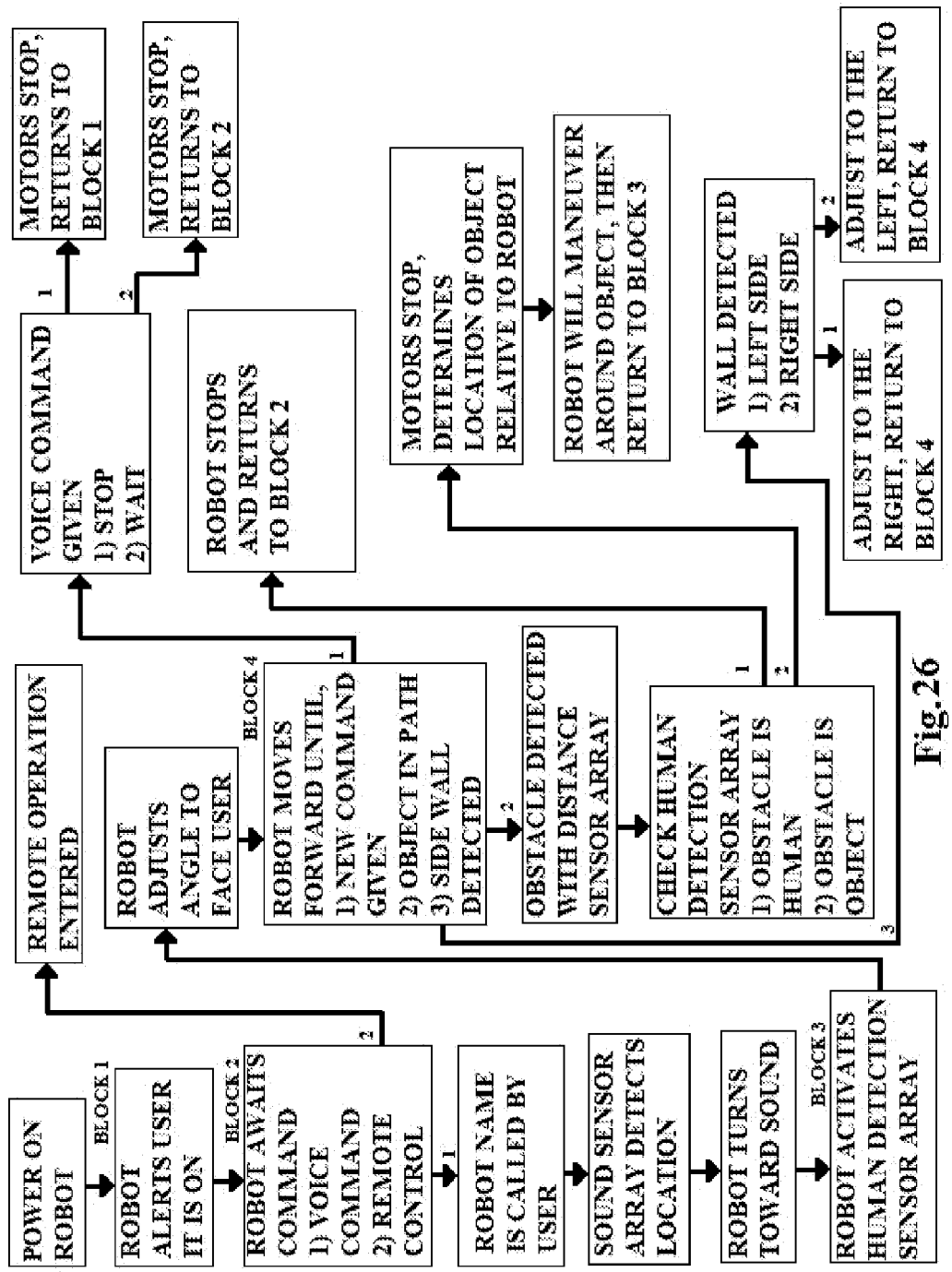

In FIGS. 25 and 26, two functions are described and shown in separate flow charts. The flowcharts depict the various steps and logic that are utilized in conjunction with the sensor inputs and motor outputs to achieve the task.

Figure 27:
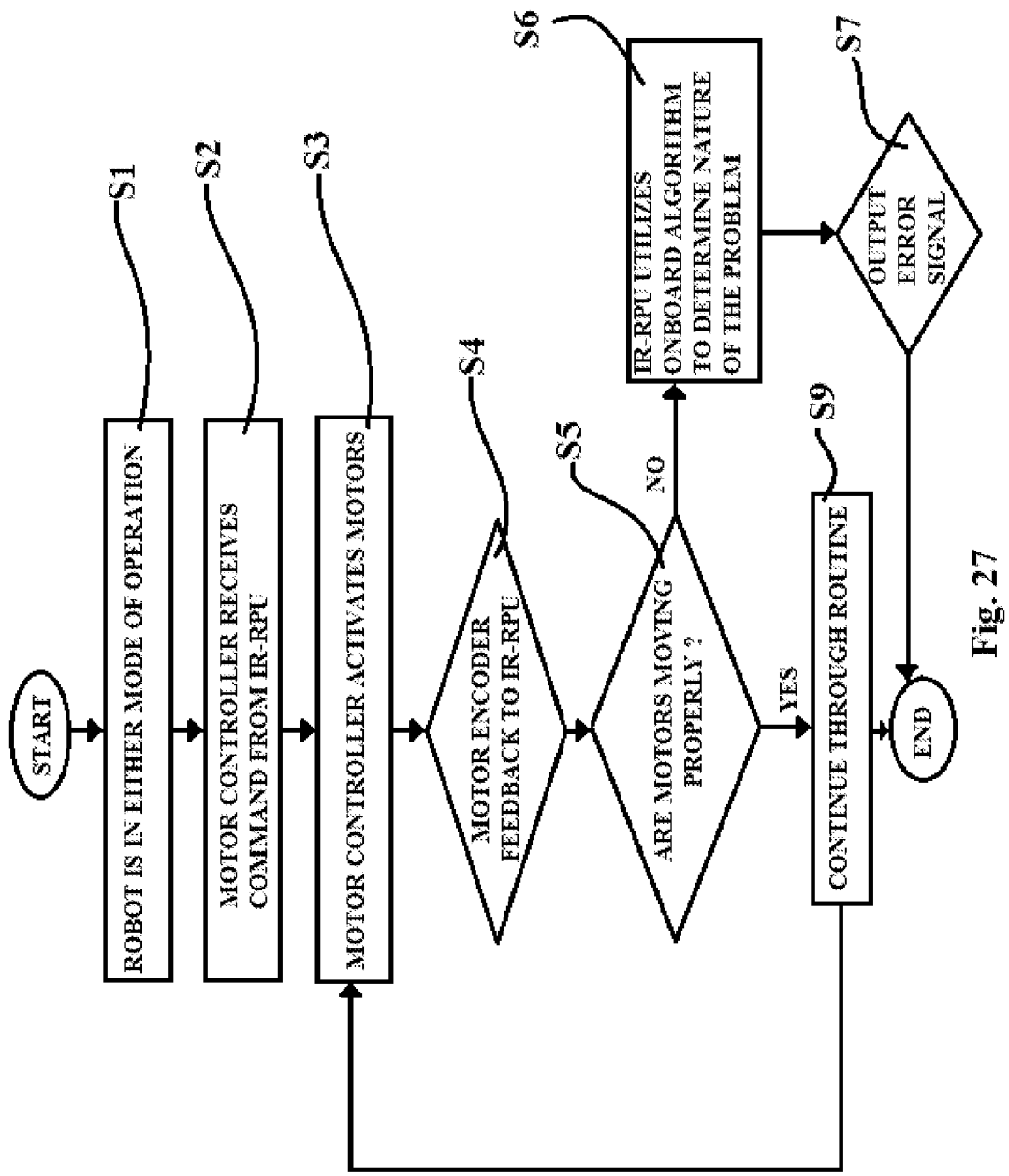
Figure 28:
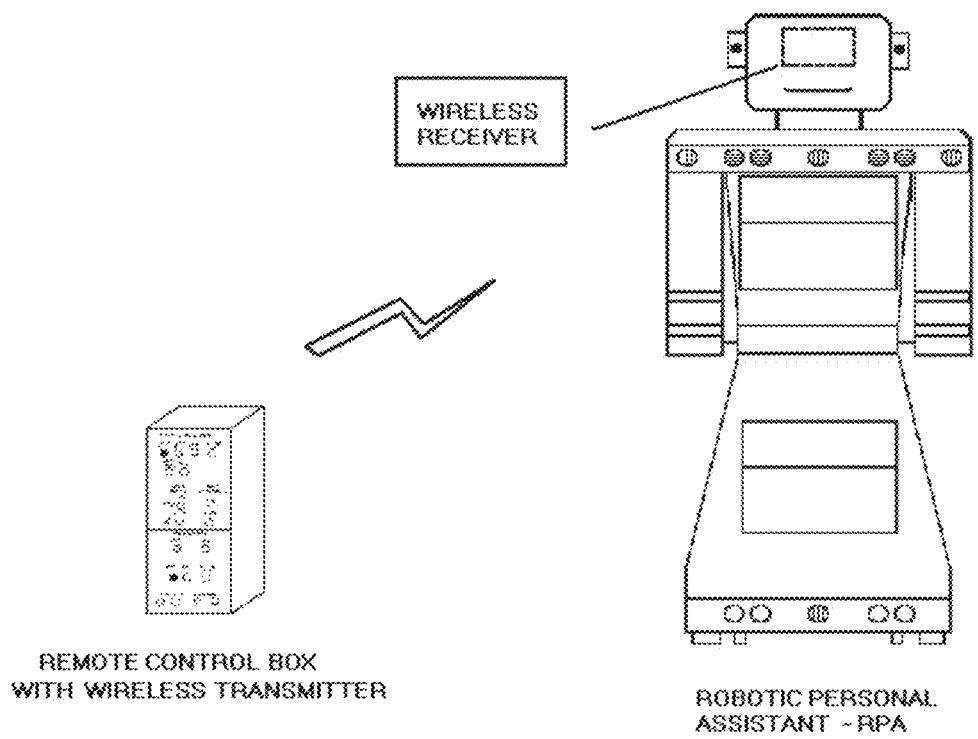
FIG. 28 illustrates a wireless communication system for the RPA.
Figure 29:
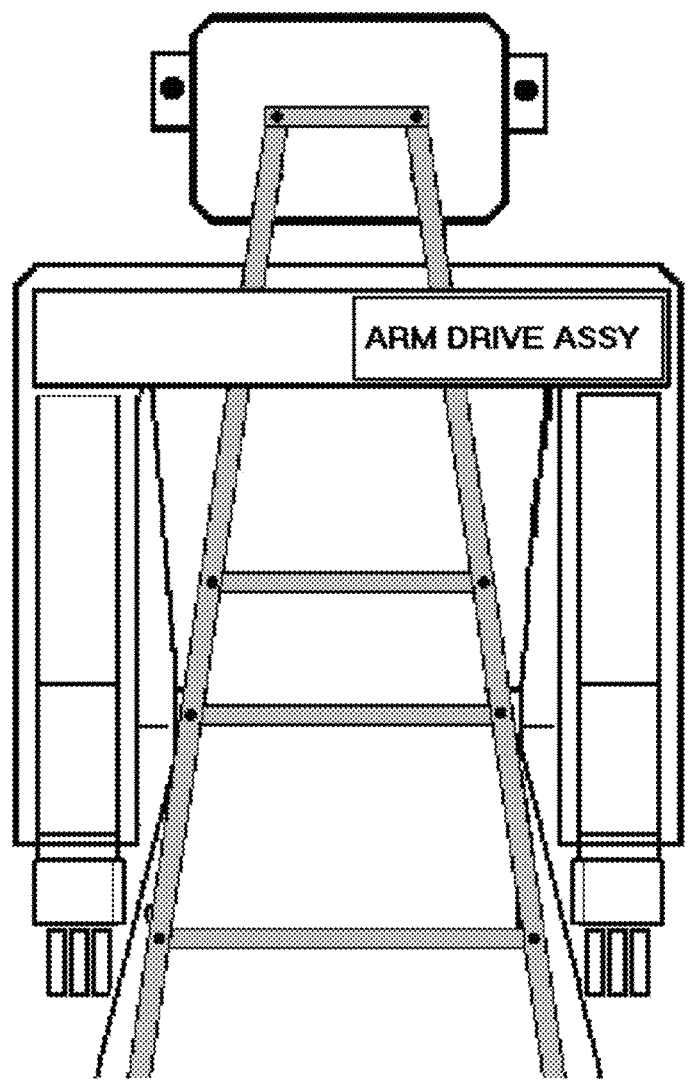
FIG. 29 illustrates an arm drive assembly of the RPA.

In FIG. 27, a flowchart is shown of how an error in wheel motion and wheel traction is detected and alerted to user. This alert sent to the user may be an audio alarm, visual display or transmitted through a wireless interface. An adjustment can then be made mechanically, reference FIG. 21, to account for wheel traction, wheel slippage or lack thereof.

h. Robotic Arm Option. FIGS. 28, 29.

This option allows the user to take direct control of the RPA by way of a wireless control box. The basic system is shown in FIG. 28. A remote control box uses a wireless data link to communicate with the RPA. The box controls the motion of the RPA's drive wheel motors as well as the Arm Drive Assembly. See FIG. 29.

The invention claimed is:

1. A robot assembly comprising:
a robot frame that comprises
a top horizontal beam assembly that defines a first rectangle;
a bottom horizontal beam assembly that defines a second rectangle;
a set of main support beams that join the first rectangle to the second rectangle to define a shape of an isosceles trapezoid; and
one or more set of intermediate support brackets that attach to the set of main support beams between the top horizontal beam assembly and the bottom horizontal beam assembly.

2. The robot assembly of claim 1, wherein each set of intermediate support brackets define a rectangle.

3. The robot frame assembly of claim 1, wherein the one or more set of intermediate support brackets comprise a first, second and third set of intermediate support brackets.

4. The robot assembly of claim 1, further comprising an external structure attached to the robot frame wherein the external structure comprises an animated appearance that includes a head, neck upper body, lower body and arms.

5. The robot assembly of claim 4, further comprising a computer system that includes a memory, processor, and more than one sensor wherein one or more sensors are attached to the external structure.

6. The robot assembly of claim 5, wherein the one or more sensors comprise a sound detecting sensor, a maneuver detection array, a distance sensor array and a human detection sensor array.

7. A robot assembly comprising:
a robot frame that comprises
a top horizontal beam assembly that defines a first rectangle;
a bottom horizontal beam assembly that defines a second rectangle; and
a set of main support beams that join the first rectangle to the second rectangle to define a shape of an isosceles trapezoid;
wherein the robot frame further comprises a shoulder assembly comprising a set of shoulder brackets that define a rectangle with a length side and a width side wherein the shoulder brackets attach to the main support beams along the length side such that the width sides extend beyond the second rectangle defined by the bottom horizontal beam assembly.

8. A robot assembly comprising:
a robot frame that comprises
a top horizontal beam assembly that defines a first rectangle;
a bottom horizontal beam assembly that defines a second rectangle;
a set of main support beams that join the first rectangle to the second rectangle to define a shape of an isosceles trapezoid; and
a connection bracket to provide an angled connection interface between the top horizontal beam assembly and the main support beams.

9. A robot assembly comprising:
a robot frame that comprises
a top horizontal beam assembly that defines a first rectangle;
a bottom horizontal beam assembly that defines a second rectangle;
a set of main support beams that join the first rectangle to the second rectangle to define a shape of an isosceles trapezoid;
a base platform attached to the bottom horizontal beam assembly;
a driver motor base assembly; and an attachment device that adjustably attaches the driver motor assembly to the base platform of the robot frame;

wherein the driver motor assembly is positioned between the top horizontal beam assembly and the bottom horizontal beam assembly.

10. The robot assembly of claim 9, wherein the driver motor base assembly comprises drive wheels that extend through an opening in the base platform.

* * * * *